Figure 1:
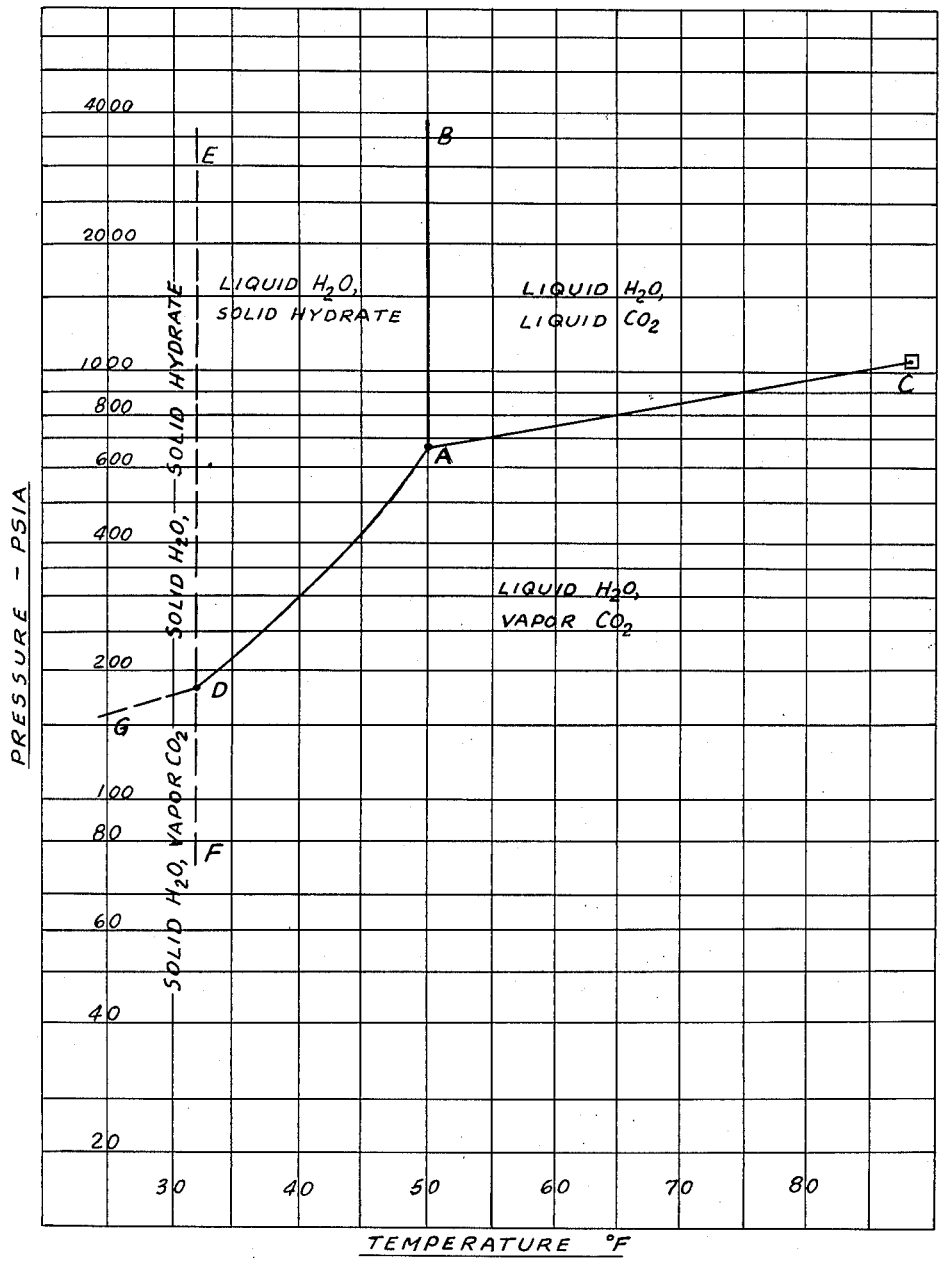

March 7, 1961

V. C. WILLIAMS 2,974,102

HYDRATE FORMING SALINE WATER CONVERSION PROCESS

Filed Nov. 9, 1959

3 Sheets-Sheet 1

INVENTOR:
VIRGIL C. WILLIAMS,
BY Kingsland, Rogers & Ezell
ATTORNEYS

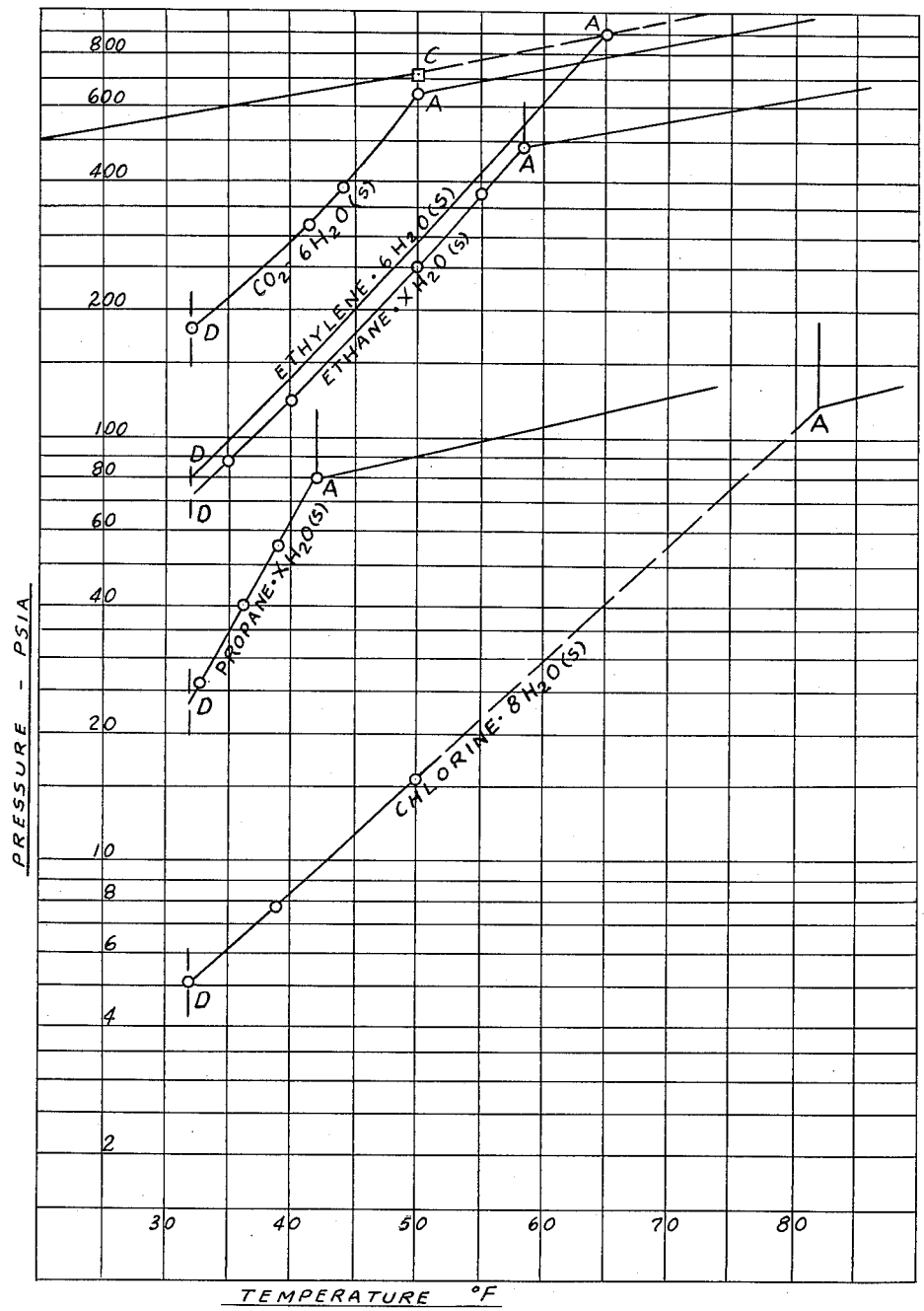

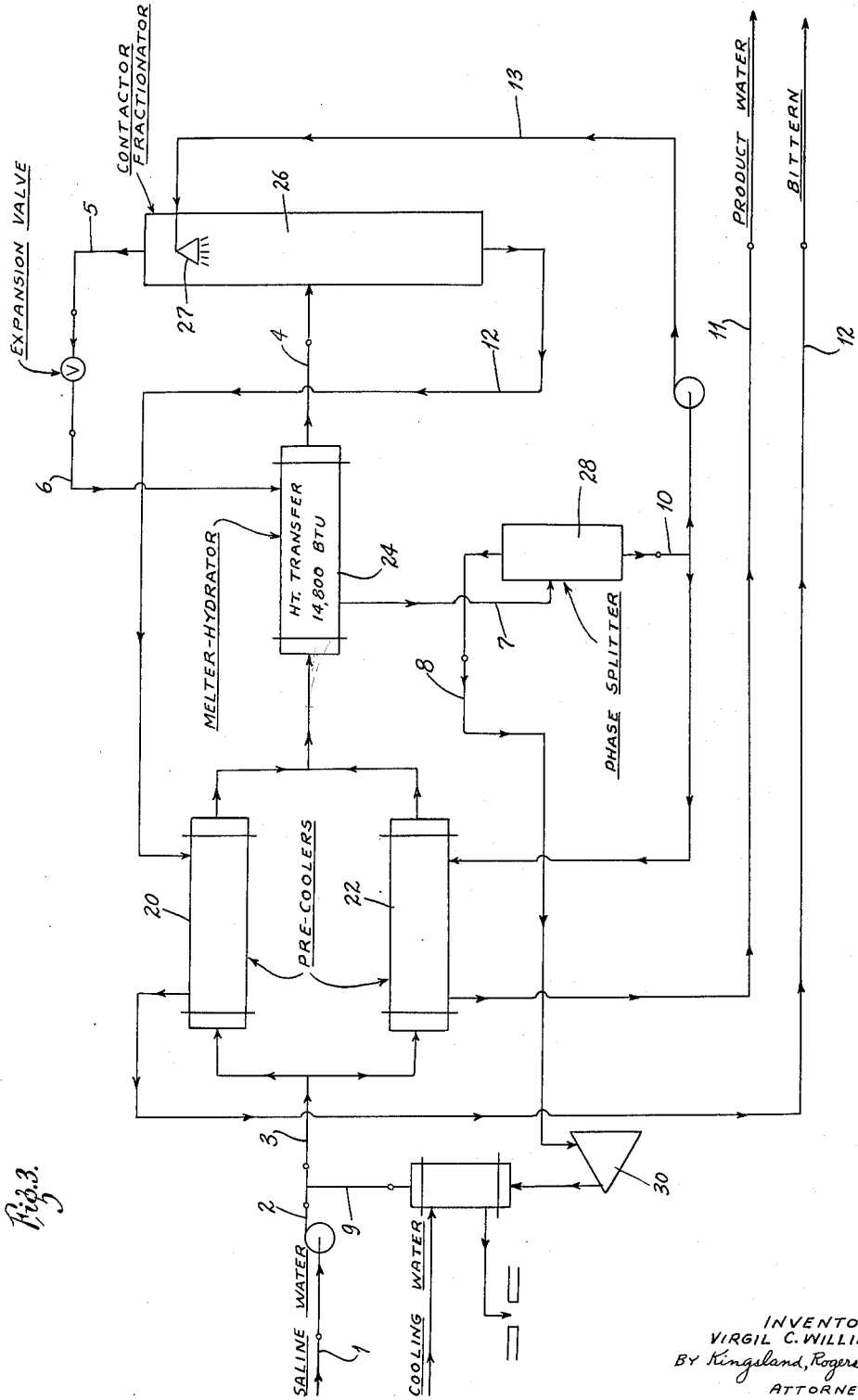

United States Patent Office 2,974,102
Patented Mar. 7, 1961

2,974,102
HYDRATE FORMING SALINE WATER CONVERSION PROCESS

Virgil C. Williams, St. Louis, Mo., assignor to Projex Engineering Corporation, St. Louis, Mo., a corporation of Missouri Filed Nov. 9, 1959, Ser. No. 851,581
17 Claims. (Cl. 210—59)

This invention relates to improvements in a process for saline water conversion and, in particular, is concerned with the production of potable water from sea water.

It has been a problem in the past to obtain potable water in a large number of regions throughout the world. This problem is one of increasing importance as industry continues to grow and as the supply of natural or fresh water diminishes. For satisfactory employment, saline water, such as sea water, which has in the order of 35,000 parts per million of salt content, must be reduced to about 500 or less parts per million. In the past, conventional saline water conversion processes have employed distillation methods or freezing methods to provide a potable water supply. The cost of such processes have been high as in the distillation process a substantial amount of heat is required and in the freezing process a temperature reduction to substantially less than 32° F. is needed due to the lowering of the freezing point of salt water. Also, contamination is a problem in the freezing process, since sodium sulfate decahydrate separates from the liquid phase at about 17° F. and ice contamination is possible.

By virtue of the instant invention a process for saline water conversion has been provided which requires only a small amount of heat transfer, which is ordinarily in the nature of refrigeration. Essentially the process comprises adding a gas to saline water under pressure and temperature conditions such that a solid hydrate of the gas is formed. This hydrate is formed in the saline water leaving a residue of saline water of higher salt content, since the hydrate formed with the gas has substantially pure water of hydration in the solid or frozen product form. The solid hydrate in crystal state is then separated from the enriched saline water. After being separated the solid hydrate under reduced pressure conditions and/or increased temperature can be caused to decompose into the original gas and pure water. The gas can then be recycled to the process and the water can be used as potable water with a portion being recycled to wash the separated solid hydrate from any residual enriched saline water in a reflux operation.

There are a number of gases which are appropriate for use in this invention. The gases employed are those which can be caused to form solid hydrates at temperatures near the ambient temperature so that no large amount of refrigeration is required. It will be understood that such solid hydrate formation requires the application of pressure for the formation of the hydrate. However, the cost of compressors and the like to accomplish the high pressure necessary is considerably more economical than the high cost of heat transfer in the conventional distillation and freezing methods of water purification. As examples of the gases that can be used in this invention, ethane, ethylene, propane, carbon dioxide and chlorine are desirable. These are listed as examples and it will be noted that hydrates of ethyl chloride, methyl iodide, bromine, methylene chloride, carbon disulfide, hydrogen sulfide, acetylene, methane, and many other substances are known and might be employed.

It is accordingly a primary object of this invention to provide a process for the production of potable water from saline water by adding a gas to the saline water and forming a solid gas hydrate therefrom and subsequently separating the solid gas hydrate into the original gas and potable liquid water.

It is a further object of this invention to provide a process for producing potable water from saline water in which a gas is added at high pressure to saline water to form a solid gas hydrate at a temperature substantially above the temperature of the freezing point of water and subsequently separating the solid gas hydrate from residual saline water and separating the solid gas hydrate at a reduced pressure to gas which is recycled to the process and to liquid potable water.

Yet a further object of this invention is to provide a process for the production of potable water from sea water in which a solid gas hydrate is formed in saline water and in which two zones are provided in a separation process, one being the zone of the solid gas hydrate and the other the zone of residual saline water of increased salt content and in which the solid gas hydrate is ultimately separated into gas and potable liquid water with a portion of the recovered liquid water being recycled to wash the solid gas hydrate free from residual saline water.

It is a further object of this invention to provide a process for the production of potable water from saline water in which a solid gas hydrate is formed in saline water and in which two zones are provided in a separation process, one being a zone of elevated pressure in which the solid gas hydrate is formed and the other zone being in closed heat transfer relation to the first zone wherein the solid gas hydrate at a lower pressure and temperature separates to gas which is recycled to the higher pressure zone and to liquid potable water with a portion of the recovered liquid water being recycled to the higher pressure zone to wash the solid gas hydrate free from residual saline water. The abstraction of heat energy to cause formation of the solid gas hydrate in the one zone is thereby furnished by the separation of the solid gas hydrate in the other zone.

Still another object of this invention is to provide a process for the production of potable liquid water from saline water in which a gas hydrate is formed under appropriate conditions of temperature and pressure by the addition of a hydrate forming gas such as ethane, ethylene, propane, carbon dioxide and chlorine.

Yet a further object of this invention is to provide a process and system for the production of liquid potable water from saline water by the addition of a gas to the saline water under appropriate pressure and temperature conditions to form a solid gas hydrate, which may then be separated from residual saline water of increased salt content in which the solid gas hydrate can be conveniently separated to gas which is recycled to the process and to potable liquid water, and in which the equipment may be of conventional construction and low economic costs and in which the process can be practiced with a minimum of controls to provide a practical method and system for recovery of potable liquid water and concentrated bitterns or saline water of high salt content from stock sea water or other types of natural saline waters.

Other objects of this invention will appear in the detailed description which follows and will be further apparent to those skilled in the art.

For the purpose of illustration of this invention, there are shown in the accompanying drawings phase diagrams and a system for the recovery of the potable water from saline water. It is to be understood that these drawings are for the purpose of example only, however, and that the invention is not limited thereto.

In the drawings:

Figure 1 is a phase diagram for the system of carbon dioxide and water under varying conditions of temperature and pressure;

Figure 2 lists several phase diagrams similar to Figure 1, but in condensed form for the hydrate systems employing ethane, ethylene, propane, carbon dioxide and chlorine; and Figure 3 is a flow sheet showing the system and method employed for the production of potable water from sea water.

In this invention the system and process for producing potable liquid water from saline water employ as a method of recovery the raising of the freezing point of the water system by the influence of pressure caused by the addition of another constituent. This may be by the addition of a gas as an example as described in more detail hereinbelow, although it will be understood that other agents may be employed. The use of a gas, however, is quite desirable since it may be caused to separate from the solid hydrate in a very simple manner by the reduction of pressure and/or elevation of temperature. The solid hydrate systems formed have a characteristic melting temperature at different pressures and are dependent upon the added substance or substances.

Reference will now be had to Figure 1, which shows, as an example only, the phase diagram of carbon dioxide which forms a solid hydrate, $CO_2 \cdot 6H_2O$ which is a distinctive molecular association of one molecule of carbon dioxide with six molecules of water, and is capable of transformation to other phases at the temperatures and pressures shown in the phase diagram.

In the phase diagram of Figure 1 the line AC represents the equilibrium between liquid and vapor carbon dioxide at a slightly higher pressure than for the pure substance due to the presence of water. Above the line AC are the liquid phases of water and carbon dioxide. The point C is the approximate critical point of carbon dioxide, which means that above this temperature the carbon dioxide cannot be liquefied no matter how high the pressure is increased. Below the line FDAC liquid water is present with dissolved carbon dioxide and vapor carbon dioxide with a small amount of water vapor. This vapor and liquid when cooled to a temperature below the line AD, that is to the left of this line on the diagram, change to a crystalline solid hydrate of $CO_2 \cdot 6H_2O$ and liquid water where there is an excess of water, which is desirable in the process. Further cooling to a temperature under that of the line DE, that is to say to the left of the line DE, causes the freezing of the excess liquid water to ice. The line GD is the boundary line between phases which comprises ice and the solid hydrate of $CO_2 \cdot 6H_2O$ above this line and ice and a vapor phase of principally carbon dioxide below this line. The line AB represents the equilibrium between the solid hydrate and liquid water to the left of this line and liquid water and liquid carbon dioxide to the right of this line. The points D and A are quadruple points of invariance with four phases present as is shown in this phase diagram.

For the purpose of this invention the curve DA in the phase diagram of Figure 1 up to the point A is of great importance, since by proper operation a solid phase containing water can be caused to separate or freeze from a liquid phase containing water at temperatures considerably higher than the normal freezing point of water alone. With saline water the same thing occurs, that is, the added substance forms a solid hydrate with water and removes it from the liquid state leaving a saline brine of higher salt content. In the case of carbon dioxide hydrates the freezing points are up to 50° F., as is illustrated in the phase diagram of Figure 1.

There are many substances which like carbon dioxide form characteristic hydrates. Of particular advantage are gases that form these hydrates and phase diagrams for some of these that have been found desirable are shown on Figure 2. In this figure the phase diagrams for the curve DA, similar to that previously explained in connection with the phase diagram of carbon dioxide of Figure 1, are represented. The gas hydrate systems which are shown are those for ethane, ethylene, propane, carbon dioxide and chlorine.

From the phase diagrams of Figure 2 it will be seen that the maximum temperature and corresponding pressure for the solid hydrate systems are as follows:

| Substance | Pressure, p.s.i.a. | Temperature, ° F. |
| --- | --- | --- |
| Carbon Dioxide | 640 | +50 |
| Ethylene | 900 | +65 |
| Ethane | 480 | +58.5 |
| Propane | 80 | +42 |
| Chlorine | 120 | +82 |

This listing of substances is by way of example for gases that have been found to be particularly desirable, but, however, as mentioned previously, this list is not limiting as hydrates of ethyl chloride, methyl iodide, bromine, methylene chloride, carbon disulfide, hydrogen sulfide, acetylene, methane, and many other substances are known.

The hydrate of ethylene is an example also of one type of phase equilibrium wherein it is possible to have solid hydrate-liquid water equilibrium at a temperature above the normal vapor-liquid critical point of the pure substance. In the case of ethylene the critical point is 50° F. but the hydrate equilibrium occurs up to 65° F. Methane acts similarly and in such cases the regions to the right and left of line DA, which has been described in connection with Figure 1, are respectively equilbria between a phase of liquid water and the substance as a vapor and a phase containing excess liquid water and the solid hydrate.

In the general economy of the invention it should be observed that the transition of one pound of water to water bound in a solid hydrate requires a heat transfer of about 200 B.t.u. This is close to the latent transition heat of pure water to pure ice at 144 B.t.u./lb. Thus, the amount of heat abstraction required is not substantially greater than that used in the production of ice but, of course, as previously described, the temperature need be only of the order of 40° or 50° or in that general neighborhood and even higher, rather than the 32° F. and below, which is required for freezing pure water. This is obviously of great advantage as it is a good deal more difficult and more expensive to provide the lower temperatures for ordinary freezing of pure water or water from saline water.

For the purpose of illustration of the process of this invention, reference is now made to the flow sheet of the process for separation of potable water from sea water as shown in Figure 3. In this process stock sea water is used having about 3½% salinity or 35,000 parts per million salt content. This is fairly representative of the salt water of the various oceans of the earth. The approximate combination of salts is as follows:

| Salt: | P.p.m. sea water (approximate) |
| --- | --- |
| NaCl | 27,213 |
| $MgCl_2$ | 3,807 |
| $MgSO_4$ | 1,658 |
| $CaSO_4$ | 1,260 |
| $K_2SO_4$ | 863 |
| $CaCO_3$ | 123 |
| $MgBr_2$ | 76 |
| | 35,000 | and water, the hydrate crystals have a specific gravity greater than that of the saline water. In this case the crystals may be taken off from the bottom and the bittern reject taken off from the top. Alternatively, in such cases, an inclined screw classifier can be used to lift the crystals upwards against a descending countercurrent flow of water. Such inclined screw classifiers are well understood in the art and can be employed where desired.

Various changes and modifications may be made in this invention as will be readily apparent to those skilled in the art. Sea water has been mentioned as the saline water to be converted, but it will be understood that other saline waters, such as salt lake water, brines, bitterns, and the like, may also be employed. It will be understood also that the examples given and the operating conditions set forth may be varied to fit different circumstances and that the invention is not limited thereto. Such changes and modifications are accordingly within the teaching of this invention as defined by the claims appended hereto.

What is claimed is:

1. A process for reducing the salt content of saline water which comprises adding to said water a gas which is capable of forming a hydrate with said water before cooling, forming a solid gas hydrate and subsequently volatilizing said gas to provide a liquid water of reduced saline content, the latent heat for the separation of said gas being provided by passing the gas hydrate in heat exchange relationship with the saline water and said gas in the solid gas hydrate formation stage to provide the necessary cooling in said formation stage.

2. A process for reducing the salt content of saline water which comprises adding to said water a gas which is capable of forming a hydrate with said water, forming a solid gas hydrate to provide a mixture of the solid hydrate having a substantially reduced saline content and residual water having an increased saline content, separating the solid hydrate from said mixture and subsequently volatilizing said gas in the hydrate to provide a liquid water of reduced saline content, the latent heat for the separation of said gas being provided by passing the gas hydrate in heat exchange relationship with the saline water and said gas in the solid gas hydrate formation stage to provide the necessary cooling in said formation stage.

3. The process of claim 2 wherein the gas employed is ethane.

4. The process of claim 2 wherein the gas employed is ethylene.

5. The process of claim 2 wherein the gas employed is propane.

6. The process of claim 2 wherein the gas employed is carbon dioxide.

7. The process of claim 2 wherein the gas employed is chlorine.

8. A process for reducing the salt content of saline water which comprises adding to said water in a pressure tight vessel a gas capable of forming a hydrate with said water, adjusting the pressure and temperature within said vessel to form a solid gas hydrate to provide a mixture of the solid hydrate having a substantially reduced saline content and residual water having an increased saline content, separating the solid hydrate from said mixture and subsequently volatilizing said gas to provide a liquid water of reduced saline content, the latent heat for the separation of said gas being provided by passing the gas hydrate in heat exchange relationship with the saline water and said gas in the solid gas hydrate formation stage to provide the necessary cooling in said formation stage.

9. A process for reducing the salt content of saline water which comprises adding to said water in a pressure tight vessel a gas capable of forming a hydrate with said water, increasing the pressure and reducing the temperature within said vessel to form a solid gas hydrate to provide a mixture of the solid hydrate having a substantially reduced saline content and residual water having an increased saline content, said temperature reduction being sufficient to freeze said gas hydrate but being substantially above the freezing point of the original saline water being treated, separating the solid hydrate from said mixture and subsequently volatilizing said gas to provide a liquid water of reduced saline content, the latent heat for the separation of said gas being provided by passing the gas hydrate in heat exchange relationship with the saline water and said gas in the solid gas hydrate formation stage to provide the necessary cooling in said formation stage.

10. A process for reducing the salt content of saline water which comprises adding to said water a gas which is capable of forming a hydrate with said water, forming a solid gas hydrate to provide a mixture of the solid hydrate having a substantially reduced saline content and residual water having an increased saline content, separating the solid hydrate from said mixture, reducing the pressure upon said solid hydrate to break part of said solid hydrate down to a volatile gas and water, the remaining portion of the solid hydrate together with the gas and water being subsequently heated to form gas and water, the latent heat for the separation of said gas being provided by passing the gas hydrate in heat exchange relationship with the saline water and said gas in the solid gas hydrate formation stage to provide the necessary cooling in said formation stage and recovering said water.

11. A process for reducing the salt content of saline water which comprises adding to said water a gas which is capable of forming a hydrate with said water, forming a solid gas hydrate to provide a mixture of the solid hydrate having a substantially reduced saline content and residual water having an increased saline content, separating the solid hydrate from said mixture, reducing the pressure upon said solid hydrate to break part of said solid hydrate down to a volatile gas and water, the latent heat for the separation of said gas being provided by passing the gas hydrate in heat exchange relationship with the saline water and said gas in the solid gas hydrate formation stage to provide the necessary cooling in said formation stage, recovering said water and recycling said gas and adding it to said saline water.

12. A process for reducing the salt content of saline water which comprises adding a gas under pressure to said water in a pressure tight system, said gas being capable of forming a hydrate with said water, reducing the temperature within a vessel to form a solid gas hydrate to provide a mixture of the solid hydrate having a substantially reduced saline content and residual water having an increased saline content, said temperature reduction being sufficient to freeze said gas hydrate but being substantially above the freezing point of the original saline water being treated, separating the solid hydrate from said mixture, conducting the hydrate in countercurrent heat exchange relation with said vessel to provide at least part of said temperature reduction, and decomposing said hydrate to a gas and liquid water of reduced saline content.

13. A process for reducing the salt content of saline water which comprises adding a gas under pressure to said water in a pressure tight system, said gas being capable of forming a hydrate with said water, reducing the temperature within a vessel to form a solid gas hydrate to provide a mixture of the solid hydrate having a substantially reduced saline content and residual water having an increased saline content, said temperature reduction being sufficient to freeze said gas hydrate but being substantially above the freezing point of the original saline water being treated, separating the solid hydrate from said mixture, conducting the hydrate in countercurrent heat exchange relation with said vessel to provide at least part of said temperature reduction and decomposing said hydrate to a gas and liquid water of reduced saline In the flow sheet of Figure 3 the process uses ethane as the gas which forms the hydrate, which is preferable because of its ready availability, non-corrosiveness, and high hydrate-forming temperature. However, as has been previously stated, other gases may also be employed. In this process the saline water after preliminary filtering out of trash and other extraneous material (not shown) is pumped at a pressure of about 400 p.s.i.a. in stream 2 with added ethane from stream 9 to provide a combined stream 3 introduced into pre-coolers 20 and 22. The mixture is then added to a combination melter-hydrator 24 where the mixture is cooled to a temperature of about 55° F. to form an equilibrium between the solid hydrate of $C_2H_6 \cdot XH_2O$ where X is about 6 with liquid brine which has an enriched salt content. The resultant slurry of the solid ethane hydrate and enriched brine is then passed through stream 4 to a vertical column 26 which is a contractor fractionator.

In the contractor fractionator the action is unique. The ethane hydrate crystals with entrapped brine are somewhat lighter than the surrounding brine since the ethane hydrate has a specific gravity of about 0.82 and the enriched brine having a salt content of about 10% has a specific gravity of about 1.08. The ethane hydrate crystals therefore are caused to rise in the column where they are taken off through a stream 5 and passed through an expansion valve with a reduction in pressure and temperature and further cooling in stream 6. This stream is introduced into the melter-hydrator 24 in closed heat exchange relation and provides refrigeration to the stock ethane and sea water. In so doing the stream 6 is heated up in the melter-hydrator and is discharged countercurrently through stream 7 into phase splitter 28. It will be appreciated in the use of the melter-hydrator that ethane hydrate can be formed at a pressure of 380° p.s.i.a. and a temperature of 55° F. from ethane and liquid water. Also, at 175 p.s.i.a and 45° F. the hydrate can be converted back to liquid water and vapor ethane. At the lower pressure and temperature then the melting-hydrate on one side of the melter-hydrator can be used to form the hydrate on the other side at a higher pressure and temperature in this closed unit which essentially operates as a heat exchanger. It will be further appreciated that the melter-hydrator on the hydrator side may employ any of the conventional tube and shell heat exchangers or scraped surface type of apparatus. This is to free the crystals of hydrate as they form from the heat exchange surface to provide for effective heat transfer and constant building up of crystals in the system.

The ethane and water in stream 7 when introduced into the phase splitter 28 are separated into a vapor stream 8 and a liquid stream 10. The vapor stream 8 is passed to an ethane compressor 30 where the pressure is increased and then after cooling of the ethane the gas is recycled by stream 9 back to the saline water feed to be used in the system again as previously described.

The liquid water separated from the phase splitter 28 is divided from its stream 10 into two portions. One portion is sent back through the precooler 22 and represents a product stream 11. The other portion, as stream 13 and having the same physical characteristics, is sent back to the fractionator 26 through a refluxing device 27. The amount of reflux is variable as it may be varied at will to give proper washing of the ethane hydrate crystals. The amount so recirculated as reflux forms a part of the cycle without disturbing the material balance. As an example, however, about 10% of the liquid water product stream 10 may be recycled as reflux with obvious variations being possible. It should be mentioned that this reflux water acts as a scrubbing medium to wash off any entrapped brine from the acicular ethane hydrate crystals and a concentration gradient is established in the column from highly purified crystals at the top to the brine contaminated crystals at the feed point where the stream 4 is introduced.

The wash brine and excess brine below the feed point are taken off from the bottom of the column as stream 12. This bittern product is, however, first used for its cooling effect in precooler 20 to make an efficient use of its low temperature in the system.

Conventional power recovery devices may be used on the product water stream and bittern reject to recover some of the power used in driving the feed pumps in the process. Also, any valuable ethane dissolved in these streams may be recovered by conventional apparatus such as heaters, activated charcoal, activated alumina, silica gel, and molecular sieve columns, and returned to the system as will be well understood in the art. A heat pump may also be operated between the hydrate slurry maker temperature and the melter heater higher temperature where desired.

In some locations for operation of recovery plants of this type it may be possible to take advantage of the fact that the water temperature of the ocean decreases with depth. For example, in some locations at a depth not exceeding 600 feet the water is about 45° F. This cold water can be used as a source of sea water and also as an external coolant for the slurry maker.

In the flow sheet of Figure 3, for the purpose of understanding this process as previously described, a stock sea water of 100 pounds may be treated as an example. In the various streams 1 through 13 the proportions and amounts and the physical state of the various materials sent through the streams are set forth in Tables I and II below. It will be understood that this is, of course, for the purpose of example only and that the invention is not limited thereto.

*Table I*

| Stream | 1 | 2 | 3 | 4 | 5 | 6 |
|---|---|---|---|---|---|---|
| Total Lbs | 100 | 100 | 122 | 122 | 107.8 | 107.8 |
| Water | 96.5 | 96.5 | 96.5 | 96.5 | 85.8 | 85.8 |
| Salt | 3.5 | 3.5 | 3.5 | 3.5 | | |
| Ethane | | | 22 | 22 | 22 | 22 |
| Hydrate, Lbs | | | | 100 | 100 | 100 |
| Water | | | | 78 | 78 | 78 |
| Ethane | | | | 22 | 22 | 22 |
| Free, Lbs | 100 | 100 | 122 | 22 | 7.8 | 7.8 |
| Water | 96.5 | 96.5 | 96.5 | 18.5 | 7.8 | 7.8 |
| Salt | 3.5 | 3.5 | 3.5 | 3.5 | | |
| Ethane | | | 22 | | | |
| Pressure, p.s.i.a | 14.7 | 380 | 380 | 380 | 380 | 175 |
| Temp., °F | 80 | 80 | 80 | 55 | 55 | 45 |
| State | L | L | L+V | L+S | L+S | L+S |

*Table II*

| Stream | 7 | 8 | 9 | 10 | 11 | 12 |
|---|---|---|---|---|---|---|
| Total Lbs | 107.8 | 22 | 22 | 85.8 | 78 | 22 |
| Water | 85.8 | | | 85.8 | 78 | 18.5 |
| Salt | | | | | | 3.5 |
| Ethane | 22 | 22 | 22 | | | |
| Hydrate, Lbs | | | | | | |
| Water | | | | | | |
| Ethane | | | | | | |
| Free, Lbs | 107.8 | 22 | 22 | 85.8 | 78 | 22 |
| Water | 85.8 | | | 85.8 | 78 | 18.5 |
| Salt | | | | | | 3.5 |
| Ethane | 22 | 22 | 22 | | | |
| Pressure, p.s.i.a | 175 | 175 | 380 | 175 | 175 | 380 |
| Temp., °F | 45 | 45 | 90 | 45 | 70 | 70 |
| State | L+V | V | V | L | L | L |

L=liquid; V=vapor; S=solid.

In the case of some hydrates, such as that of chlorine content and recycling said gas to the process in the hydrate forming stage.

14. A process for reducing the salt content of saline water which comprises adding a gas under pressure to said water in a pressure tight system, said gas being capable of forming a hydrate with said water, reducing the temperature within a vessel to form a solid gas hydrate to provide a mixture of the solid hydrate having a substantially reduced saline content and residual water having an increased saline content, said temperature reduction being sufficient to freeze said gas hydrate but being substantially above the freezing point of the original saline water being treated, separating the solid hydrate from said mixture, conducting the hydrate in countercurrent heat exchange relation with said vessel to provide at least part of said temperature reduction, and decomposing said hydrate to a gas and liquid water of reduced saline content and recycling a portion of said water in the process to wash the hydrate free of saline water.

15. A process for reducing the salt content of saline water which comprises adding to said water a gas which is capable of forming a hydrate with said water, forming a solid gas hydrate to provide a mixture of the solid hydrate having a substantially reduced saline content and residual water having an increased saline content, separating the solid hydrate from said mixture in a column with the hydrate being taken off at one end and saline water of enriched salt content at the other end, reducing the pressure upon said solid hydrate to break part of said solid hydrate down to a volatile gas and water, the remaining portion of the solid hydrate together with the gas and water being subsequently heated to form gas and water, the latent heat for the separation of said gas being provided by passing the gas hydrate in heat exchange relationship with the saline water and said gas in the solid gas hydrate formation stage to provide the necessary cooling in said formation stage, and separating said water.

16. A process for reducing the salt content of saline water which comprises adding to said water a gas which is capable of forming a hydrate with said water, forming a solid gas hydrate to provide a mixture of the solid hydrate having a substantially reduced saline content and residual water having an increased saline content, separating the solid hydrate from said mixture in a column with the hydrate being taken off at one end and saline water of enriched salt content at the other end, reducing the pressure upon said solid hydrate to break part of said solid hydrate down to a volatile gas and water, the remaining portion of the solid hydrate together with the gas and water being subsequently heated to form gas and water, the latent heat for the separation of said gas being provided by passing the gas hydrate in heat exchange relationship with the saline water and said gas in the solid gas hydrate formation stage to provide the necessary cooling in said formation stage, and separating said water, and recycling a part of said water to the column to wash the solid hydrate free of saline water.

17. A process for reducing the salt content of saline water which comprises adding to said water a gas which is capable of forming a hydrate with said water, forming a solid gas hydrate to provide a mixture of the solid hydrate having a substantially reduced saline content and residual water having an increased saline content, separating the solid hydrate from said mixture in a column with the hydrate being taken off at one end and saline water of enriched salt content at the other end, reducing the pressure upon said solid hydrate to break part of said solid hydrate down to a volatile gas and water, the remaining portion of the solid hydrate together with the gas and water being subsequently heated to form gas and water, the latent heat for the separation of said gas being provided by passing the gas hydrate in heat exchange relationship with the saline water and said gas in the solid gas hydrate formation stage to provide the necessary cooling in said formation stage, separating said water, recycling a part of said water to the column to wash the solid hydrate free of saline water, and recycling said gas to the process by adding it to saline water at the start of the process to form additional hydrate.

References Cited in the file of this patent

UNITED STATES PATENTS 2,904,511    Donath _____ Sept. 15, 1959